US012339779B2

(12) United States Patent
Ganguly et al.

(10) Patent No.: US 12,339,779 B2
(45) Date of Patent: Jun. 24, 2025

(54) METHOD AND APPARATUS FOR REPLACING DATA FROM NEAR TO FAR MEMORY OVER A SLOW INTERCONNECT FOR OVERSUBSCRIBED IRREGULAR APPLICATIONS

(71) Applicant: UNIVERSITY OF PITTSBURGH—OF THE COMMONWEALTH SYSTEM OF HIGHER EDUCATION, Pittsburgh, PA (US)

(72) Inventors: Debashis Ganguly, Pittsburgh, PA (US); Rami G. Melhem, Pittsburgh, PA (US); Ziyu Zhang, Pittsburgh, PA (US); Jun Yang, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 17/594,362

(22) PCT Filed: Apr. 17, 2020

(86) PCT No.: PCT/US2020/028696
§ 371 (c)(1),
(2) Date: Oct. 13, 2021

(87) PCT Pub. No.: WO2020/226878
PCT Pub. Date: Nov. 12, 2020

(65) Prior Publication Data
US 2022/0197811 A1    Jun. 23, 2022

Related U.S. Application Data

(60) Provisional application No. 62/842,679, filed on May 3, 2019.

(51) Int. Cl.
*G06F 12/0862* (2016.01)
*G06F 12/0891* (2016.01)
(Continued)

(52) U.S. Cl.
CPC ...... *G06F 12/0862* (2013.01); *G06F 12/0891* (2013.01); *G06F 13/1668* (2013.01);
(Continued)

(58) Field of Classification Search
CPC ............. G06F 12/0862; G06F 13/1668; G06F 2212/6028
(Continued)

(56) References Cited

U.S. PATENT DOCUMENTS 6,253,297 B1 *  6/2001  Chauvel .................. G06F 13/28
                                                                 711/167
7,102,646 B1    9/2006  Rubinstein et al.
(Continued)

FOREIGN PATENT DOCUMENTS

DE    102013022168 A1    9/2014

OTHER PUBLICATIONS

Zheng, Tianhao, David Nellans, Arslan Zulfiqar, Mark Stephenson, and Stephen W. Keckler. "Towards high performance paged memory for GPUs." In 2016 IEEE International Symposium on High Performance Computer Architecture (HPCA), pp. 345-357. IEEE, 2016.
(Continued)

*Primary Examiner* — Arpan P. Savla
*Assistant Examiner* — Sidney Li
(74) *Attorney, Agent, or Firm* — Philip E. Levy; Eckert Seamans Cherin & Mellott, LLC

(57) ABSTRACT

A data management method wherein a working set is distributed between near and far memories includes migrating first data from the far to the near memory according to
(Continued)

a prefetcher algorithm. The first data (a subset of the working set) is maintained in the near memory in data structures according to predetermined semantics of the prefetcher that dictate that certain of the first data is prefetched when a first function evaluates as true. The method further includes detecting that the near memory has reached capacity, and in response, adaptively migrating a portion of the first data out of the near and into the far memory according to an eviction algorithm that is based on the set of prefetcher semantics such that certain of the portion of the first data is evicted when a second function evaluates as true, wherein the second function equals the inverse of the first function.

33 Claims, 5 Drawing Sheets

(51) Int. Cl.
 *G06F 13/16* (2006.01)
 *G06F 13/42* (2006.01)
 *G06F 12/1027* (2016.01)
(52) U.S. Cl.
 CPC .. *G06F 13/4221* (2013.01); *G06F 2212/2542* (2013.01); *G06F 2212/6028* (2013.01)
(58) Field of Classification Search
 USPC ......................................................... 711/118
 See application file for complete search history.

(56) References Cited

U.S. PATENT DOCUMENTS

| | | | |
|---|---|---|---|
| 8,904,068 B2 | 12/2014 | Durant et al. | |
| 9,430,400 B2 | 8/2016 | Duluk, Jr. | |
| 9,563,562 B2 | 2/2017 | Rowlands et al. | |
| 9,575,892 B2 | 2/2017 | Deming et al. | |
| 9,672,158 B2 | 6/2017 | Karamcheti et al. | |
| 2008/0320235 A1* | 12/2008 | Beckmann | G06F 12/126 711/E12.001 |
| 2011/0178976 A1* | 7/2011 | Nishiyama | G06N 20/00 706/46 |
| 2014/0082288 A1 | 3/2014 | Beard et al. | |
| 2014/0281264 A1 | 9/2014 | Duluk, Jr. et al. | |
| 2014/0281299 A1 | 9/2014 | Duluk, Jr. et al. | |
| 2014/0351546 A1* | 11/2014 | Lichmanov | G06F 12/06 711/170 |
| 2016/0034195 A1* | 2/2016 | Li | G06F 3/0659 711/117 |
| 2016/0210251 A1 | 7/2016 | Nale et al. | |
| 2017/0123796 A1 | 5/2017 | Kumar et al. | |
| 2017/0139832 A1* | 5/2017 | Gupta | G06F 12/0855 |
| 2018/0024932 A1* | 1/2018 | Nachimuthu | G06F 3/0673 711/213 |
| 2018/0189182 A1* | 7/2018 | Wang | G06F 12/0864 |
| 2019/0026157 A1* | 1/2019 | Suzuki | G06F 9/4881 |

OTHER PUBLICATIONS

Yan et al. Nimble Page Management for Tiered Memory Systems. In 2019 Architectural Support for Programming Languages and Operating Systems (ASPLOS '19), Apr. 13-17, 2019, (retrieved on Jun. 13, 2020]. Retrieved from the Internet: <URL: http://www.cs.yale.edu/homes/abhishek/ziyan-asplos 19.pdf> pp. 1-15.

Li, Chen, Rachata Ausavarungnirun, Christopher J. Rossbach, Youtao Zhang, Onur Mutlu, Yang Guo, and Jun Yang. "A Framework for Memory Oversubscription Management in Graphics Processing Units." (2019).

* cited by examiner

METHOD AND APPARATUS FOR REPLACING DATA FROM NEAR TO FAR MEMORY OVER A SLOW INTERCONNECT FOR OVERSUBSCRIBED IRREGULAR APPLICATIONS

CROSS-REFERENCE TO RELATED APPLICATIONS

This application is a U.S. National Stage Application under 35 U.S.C. § 371 of International Application No. PCT/2020/028696, filed on Apr. 17, 2020, entitled "METHOD AND APPARATUS FOR REPLACING DATA FROM NEAR TO FAR MEMORY OVER A SLOW INTERCONNECT FOR OVERSUBSCRIBED IRREGULAR APPLICATIONS", which claims priority under 35 U.S.C. § 119(e) from U.S. Provisional Patent Application No. 62/842,679, filed on May 3, 2019, entitled "TREE-BASED NEIGHBORHOOD PAGE REPLACEMENT POLICY IN UNIFIED VIRTUAL MEMORY FOR GENERAL PURPOSE GPUS," the contents of which are incorporated herein by reference.

GOVERNMENT CONTRACT

This invention was made with government support under grant #1725657 awarded by the National Science Foundation (NSF). The government has certain rights in the invention.

BACKGROUND OF THE INVENTION

1. Field of the Invention

The present invention pertains to heterogeneous non-uniform memory access (NUMA) systems made of discrete and disparate memory modules with heterogeneity in their performance characteristics and storage capacity (e.g., a near memory that is performance-optimized but capacity-constrained, and a far memory that is capacity-optimized, but performance-constrained) such that performance can be quantified by access latency and bandwidth. More specifically, the present invention pertains to a method and apparatus for replacing data from near to far memory over a slow interconnect for oversubscribed irregular applications. The present invention has applicability in heterogeneous NUMA system cases, such as a multi-socket system, a CPU-GPU heterogeneous system, or a heterogeneous hybrid memory system, where the near and far memories are connected to one another by an off-chip, off package data-fabric or interconnect (e.g., PCIe, xGMI, etc.).

2. Description of the Related Art

Today, heterogeneity in memory technology and core types is ubiquitous in systems starting from hand-held smartphones to large supercomputers and commodity cloud platforms. For example, Oak Ridge National Laboratory's Titan supercomputer incorporates graphics processing units (GPUs) and Intel Corporation's Xeon Phi™ co-processors alongside traditional central processing units (CPUs). Similarly, Amazon Web Services (AWS), one of the largest cloud providers, offers instances of CPU-GPU platforms built with CPUs from Intel Corporation and GPUs from NVIDIA Corporation. The union of high thermal design power (TDP) processors in heterogeneous systems offers new performance opportunities for applications. For example, while serial code sections can run efficiently on ILP-optimized CPU processors, parallel code with fine grained data parallelism benefits from running on accelerators such as GPUs, resulting in aggregate savings of millions of dollars in large-scale systems.

While some of these heterogeneous systems may share a single homogeneous pool of physical memory between CPUs and GPUs, discrete GPUs connected with x86 processors via peripheral component interconnect express (PCIe) dominate the marketplace. As the number of scalar cores and SIMT (Single Instruction Multiple Threads) units in GPUs continued to grow, memory bandwidth also scaled proportionately to keep the compute resources busy. However, GPU memory capacity remains relatively small as compared to the capacity of CPU-attached memory. For example, while CPUs are likely to continue using cost and capacity-optimized DRAM (e.g., DDR4, LPDDR4) technology, GPUs are moving towards using capacity-limited, but bandwidth-optimized, on-package memory such as GDDR5, High Bandwidth Memory (HBM) and Wide-IO2 (WIO2). Due to the large differences in bandwidth and capacity of the individual memory modules, memory management becomes challenging with respect to the system design and programmability of discrete CPU-GPU systems.

Due to discrete physical memory modules, application programmers traditionally had to explicitly call memory copy APIs to copy pre-initialized data over the relatively slow PCIe bus to the GPU's physical memory before launching GPU kernels. This upfront memory transfer is an important aspect while quantifying GPU performance, because for long-running GPU kernels, this bandwidth-optimized bulk-transfer amortizes the migration overhead. However, relatively smaller GPU memory capacity restricts the effective working sets of the GPU programs. As a result, the onus of memory management falls squarely on the programmers. Application developers are forced to tile their data for migration and painstakingly launch GPU kernels over multiple iterations. This burden has been considerably relaxed by the introduction of Unified Virtual Memory (UVM). To date, stand-alone PCIe-attached GPUs are treated as slave accelerators. The runtime, loaded as a set of kernel modules in the host operating system, is the key to tap into the computation capabilities of a GPU. Both Advanced Micro Devices, Inc. (AMD) and NVIDIA Corporation introduced software-managed runtimes which provide the illusion of unified memory space by providing a virtual memory pointer shared between CPU and GPU. With the assistance from hardware page-faulting and migration engines, UVM automates the migration of data in and out of the GPU memory even upon GPU-memory over-subscription.

Although fault-driven migration and non-blocking, outstanding, replayable page faults in unified memory improves programmability, it is not sufficient. As the massive thread-level parallelism (TLP) of GPUs can no longer mask the latency of migrating pages over PCIe, researchers have felt the need for prefetching pages in advance and overlapping computation with migration of future-referenced pages. The concept of prefetching is not new in hierarchical memory systems. Prefetchers are designed to exploit spatial- and/or temporal-locality of memory accesses of prevalent workloads to reduce the amount of time a computation pipeline is stalled for availability of data/operands. In the past, researchers had explored both micro-architectural and software-based prefetchers. However, prefetching pages between host and device memory over the CPU-GPU interconnect stands out due to several unique system properties and performance requirements in contrast to hierarchical memory models in traditional multi-core symmetric multi-processor (SMP) systems. Firstly, when the working set of a GPU workload fits in the GPU device memory, aggressive prefetching has little to no downside, as performance always benefits from bandwidth-optimized access to local memory. However, for applications with sparse, random, and seldom accessed memory allocations, prefetching pages indiscriminately can cause serious performance overhead. This is why an aggressive hardware prefetcher is not best suited for GPUs. Similarly, considering the requirement of higher programmability and application-transparency, user-assisted and/or compiler-directed prefetchers are not preferred for GPU workloads. Secondly, because of the large number of SIMT units and massive TLP, GPUs are constantly generating on demand requests for page migrations. As a result, a prefetcher cannot afford to flood the DMA engine with prefetch requests and in turn throttle on-demand transfers.

Acknowledging these unique challenges for prefetching presented in CPU-GPU memory hierarchy, researchers have proposed the concept of software prefetchers. For example, a tree-based software prefetcher is implemented by the CUDA® runtime of the CUDA® parallel computing platform and programming model developed by NVIDIA Corporation. Implementing a prefetcher in GPU runtime exposes new opportunities by taking away limitations of both hardware and compiler-assisted prefetchers. Because the GPU interrupts the runtime hosted on the CPU and communicates the pending faults, the runtime is in the unique position of maintaining a historic view of the memory accesses and making an informed choice of selecting a prefetch candidate. For example, the NVIDIA UVM prefetcher maintains a set of full binary trees with 64 KB basic blocks at the leaf-level and up to 2 MB (OS-supported transparent large-page granularity) chunks as the root node. Based on the current occupancy of the tree and applying a thresholding scheme to balance between two children of a non-leaf node, runtime drives the prefetching decision. Thus, this software prefetcher is both cognizant of temporal locality of past accesses confined within the spatial locality of 2 MB large-page. From micro-benchmarking, it can be noted that with 16 GB/s PCIe 3.0, latencies to migrate a 4 KB (the size of a physical page) and a 1 MB transfer unit are 1.18 us and 87 us respectively. That latency of migrating a 1 MB large-transfer unit (or 512 4 KB pages) is equivalent to piecemeal transferring of discrete 80 4 KB pages in terms of latency. This is because large batched DMA transfers amortize the cost of the actual DMA setup across many pages. As a result, this tree-based prefetcher reduces the page migration latency and improves overall performance reaching the optimal transparent huge-page migration.

However, when GPU memory has no free space to allocate pages for newer migration, aggressive prefetching can be counterproductive. Runtime, upon detecting memory oversubscription, needs to evict pages to allow not only on-demand migration but also insertion of prefetch candidates. An easy solution can be disabling further prefetching under device memory oversubscription. Researchers have studied both least recently used (LRU) and random page replacements in the context of GPU memory over-subscription. However, the page replacement schemes, which had stood the-test-of-time for traditional cache hierarchy and hybrid-memory systems, are not useful in the context of GPU memory oversubscription. This is because often with varied numbers of SIMT units and in turn TLP, memory access patterns of GPU workloads change dramatically. Further, with changes in memory access patterns, the choice of eviction candidates becomes non-trivial. This is further exacerbated in the presence of prefetching. Thus, design considerations to address over-subscription in CPU-GPU heterogeneous memory management demand a thorough understanding of complex interaction between newer on-demand migration, software-prefetching, and page eviction. For example, although the strict 2 MB large page granularity of the current LRU implementation in the NVIDIA UVM allows prefetching using a tree-based prefetcher, it causes serious page thrashing for irregular applications with sparse, random memory accesses (the strict granularity of 2 MB means that irrespective of whether the pages within the 2 MB are dirty or clean, the GPU memory management unit (GMMU) always writes back 2 MB memory from device to host).

SUMMARY OF THE INVENTION

In one embodiment, a method of managing data is provided for use during execution of an application that uses a working set of data that is distributed between a near memory and a far memory. The method includes migrating first data in bulk from the far memory to the near memory and storing the first data in the near memory according to a prefetcher algorithm. The first data is a subset of the working set of data and is migrated from the far memory and maintained in the near memory in a set of data structures according to a set of predetermined semantics of the prefetcher algorithm. The predetermined semantics dictate that certain of the first data is prefetched when a first function evaluates as true. The method further includes detecting that the near memory has reached its capacity and cannot accommodate new data migration, and responsive to the detecting, adaptively migrating a portion of the first data out of the near memory and into the far memory according to an eviction algorithm that is based on the set of predetermined semantics of the prefetcher algorithm such that certain of the portion of the first data is evicted when a second function evaluates as true, wherein the second function equals the inverse of the first function.

In another embodiment, a system for executing an application is provided. The system includes a processing unit, a near memory, and a far memory coupled to the near memory. The processing unit is configured to execute the application using a working set of data in a condition where the working set of data is distributed between the near memory and the far memory, and wherein the system is configured to cause first data to be migrated in bulk from the far memory to the near memory and stored in the near memory according to a prefetcher algorithm. The first data is a subset of the working set of data and is migrated from the far memory and maintained in the near memory in a set of data structures according to a set of predetermined semantics of the prefetcher algorithm, wherein the predetermined semantics dictate that certain of the first data is prefetched when a first function evaluates as true. The system is configured to detect that the near memory has reached its capacity and cannot accommodate new data migration, and, responsive to the detecting that the near memory has reached its capacity and cannot accommodate new data migration, cause a portion of the first data to be adaptively migrated out of the near memory and into the far memory according to an eviction algorithm that is based on the set of predetermined semantics of the prefetcher algorithm such that certain of the portion of the first data is evicted when a second function evaluates as true, wherein the second function equals the inverse of the first function.

In still another embodiment, an apparatus for use in a system for executing an application is provided, wherein the application uses a working set of data, wherein the working set of data is distributed between a near memory and a far memory that are coupled to one another. The apparatus includes a processing unit configured to: (i) cause first data to be migrated in bulk from the far memory to the near memory and stored in the near memory according to a prefetcher algorithm, wherein the first data is a subset of the working set of data and is migrated from the far memory and maintained in the near memory in a set of data structures according to a set of predetermined semantics of the prefetcher algorithm, wherein the predetermined semantics dictate that certain of the first data is prefetched when a first function evaluates as true, and (ii) responsive to the detecting that the near memory has reached its capacity and cannot accommodate new data migration, cause a portion of the first data to be adaptively migrated out of the near memory and into the far memory according to an eviction algorithm that is based on the set of predetermined semantics of the prefetcher algorithm such that certain of the portion of the first data is evicted when a second function evaluates as true, wherein the second function equals the inverse of the first function.

DETAILED DESCRIPTION OF EXEMPLARY EMBODIMENTS

Figure 1A:
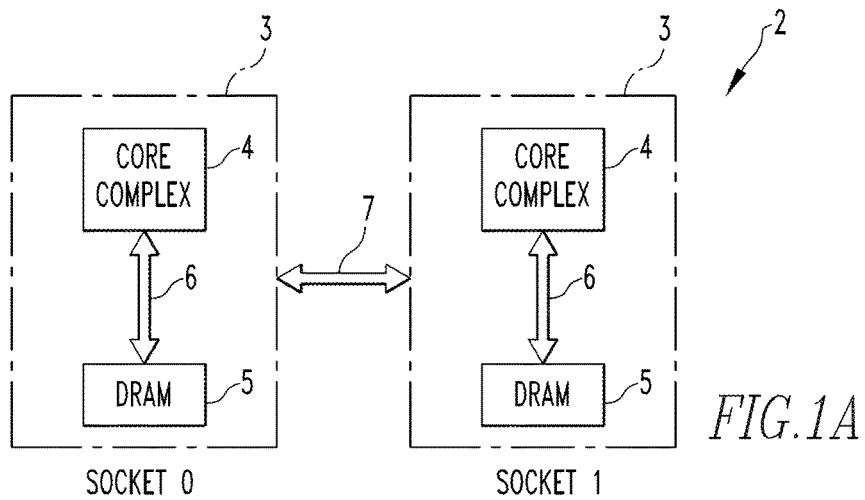
FIGS. 1A, 1B and 1C are schematic diagrams of heterogeneous NUMA systems according to various exemplary embodiments of the disclosed concept in which the eviction algorithm of the disclosed concept may be implemented.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

As described in detail herein, the disclosed concept provides a method and apparatus that aims to improve the performance of irregular applications (i.e., applications with unpredictable memory access) in systems that include a first processing unit, such as an accelerator like a GPU, coupled to a second processing unit, such as a host central processing unit (CPU) via a slow interconnect, such as a PCIe interconnect, wherein the working sets of such irregular applications are distributed between a near memory coupled to the first processing unit and a far memory coupled to second processing unit. The disclosed concept assumes that the far memory is capacity-optimized and that the near memory is limited in capacity but is bandwidth optimized. In such a system, when faced with the challenge of migrating data on which a current computation is dependent (and as such is stalled) over the slow interconnect, the memory management module of the system is required to make smart choices to reduce memory access latency. As discussed elsewhere herein, one of the many techniques to eliminate memory access latency from the critical path of execution is to prefetch data in bulk such that computation and data migration over the slow interconnect can be overlapped. The disclosed concept, as described in detail herein, demonstrates that prefetching data in bulk improves spatial and temporal locality of access and can improve performance over piecemeal migration of data only on being demanded by the computation engine.

As noted above, in the exemplary embodiment, the working set of the application does not fit in the bandwidth optimized near memory that is located physically near to the current computation engine, and, as a result, part of the working set is spilled over into the far memory that is connected via the slow interconnect. As the near memory capacity is smaller than the working set, during the course of execution, the memory management unit (which can be either software or hardware or a combination thereof) needs to move older data out of the near memory and write it back to the far memory over the interconnect before it can move new data needed and requested by the computation engine from the far memory to the near memory. This process is popularly known as an eviction or replacement process. Based on the granularity of the eviction unit and the nature of the near and far memories, the process can be cache eviction/replacement or page eviction/replacement. The disclosed concept focuses on the cases where eviction is triggered as the near memory reaches its capacity and thus cannot accommodate new data migration.

The disclosed concept objectively demonstrates that a prefetcher can exacerbate oversubscription of the near memory and can cause unnecessary replacement of useful data. Most notably for irregular applications, the prefetcher can cause serious thrashing of the memory if the eviction algorithm is not aware of and not in sync with the prefetching semantics. To this end, the disclosed concept provides that the algorithm(s) responsible for evicting and writing data back from the near memory to the far memory should be inspired by and work in tandem with the prefetcher responsible for migrating data in bulk from the far memory to the near memory over the slow interconnect. Such seamless coordination between prefetching and eviction algorithms improves performance of irregular applications with oversubscribed working sets split between the near and far memories.

The disclosed concept has applicability in heterogeneous NUMA system cases, such as a multi-socket NUMA system, a CPU-GPU heterogeneous system, or a heterogeneous hybrid memory system, where the near and far memories are connected by an off-chip, off package data-fabric or interconnect (e.g., PCIe, xGMI, etc.). Furthermore, it will be understood that, while one particular non-limiting exemplary embodiment/use case that is based on NVIDIA/CUDA® Terminology is described herein for illustrate purposes (FIGS. 3-5), the disclosed concept is vendor agnostic and applies to any discrete CPU-GPU system. Other example venders that provide systems with a discrete accelerator attached to a CPU via and interconnect in which the disclosed concept may be implemented include, without limitation, Mythic Inc., GraphCore Ltd, Groq, Inc., Cerebras Systems, Inc., Advanced Micro Devices, Inc., Intel Corporation. More generally, the disclosed concept is not limited to just systems that employ a discrete accelerator attached to a CPU, bit instead applies to any heterogeneous NUMA system comprising discrete and disparate memory modules with heterogeneity in their performance characteristics and storage capacity. A number of such exemplary systems are described below.

FIG. 1A is a schematic diagram of a heterogeneous NUMA system according to one exemplary embodiment of the disclosed concept. The heterogeneous NUMA system shown in FIG. 1A is in the form of a multi-socket NUMA system 2 that includes two homogenous memory modules. In particular, multi-socket NUMA system 2 includes a pair of packages, each labeled with reference 3. As seen in FIG. 1A, each package 3 includes a core complex 4 connected to an off-chip volatile memory module 5 (e.g., DRAM with DDR technology) via an off-chip, on-package data fabric 6. The packages 3 are commonly known as sockets. The two packages 3 are connected via an off-chip, off-package data fabric 7, such as Intel's QuickPath Interconnect (QPI), formerly known as Common System Interface (CSI) or HyperTransport (HT), formerly known as Lighting Data Transport (LDT). Multi-socket NUMA system 2 results in different performance characteristic while accessing on-package or on-socket memory modules or memory near to a given core complex in contrast to accessing off-package/socket memory module far from the core complex via off-package data-fabric.

Figure 1B:
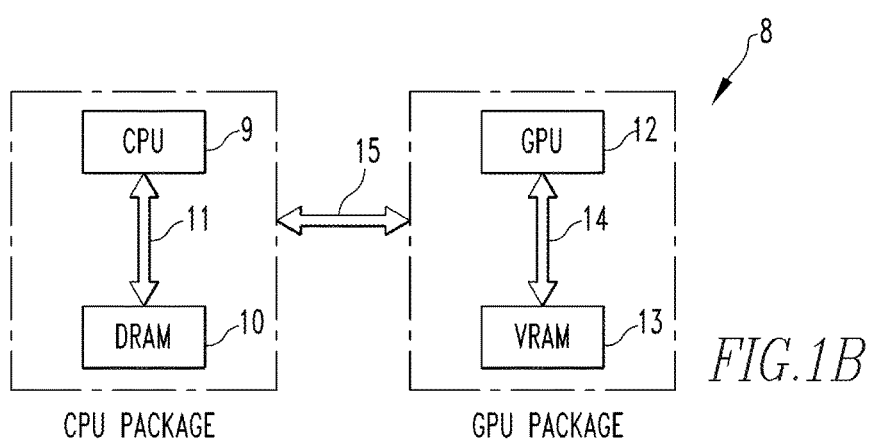

FIG. 1B is a schematic diagram of a heterogeneous NUMA system according to another exemplary embodiment of the disclosed concept. The heterogeneous NUMA system shown in FIG. 1B is in the form of a CPU-GPU heterogeneous system 8 composed of heterogeneous memory modules. In particular, as seen in FIG. 1B, CPU complex 9 is connected to a DRAM module 10 (e.g., DDR4) via an off-chip, on-package data fabric 11, and GPU compute unit 12 is connected to a VideoRAM 13 (e.g., GDDR5, HBM) via an off-chip, on-package data fabric 14. The CPU and GPU packages are connected an via off-chip, off-package data fabric 15, such as NVLINK, PCIe, xGMI, etc. This results in a non-uniform memory access by GPU 12 between accessing local VRAM 13 vs far DRAM 10 over off-chip, off-package data fabric 15.

Figure 1C:
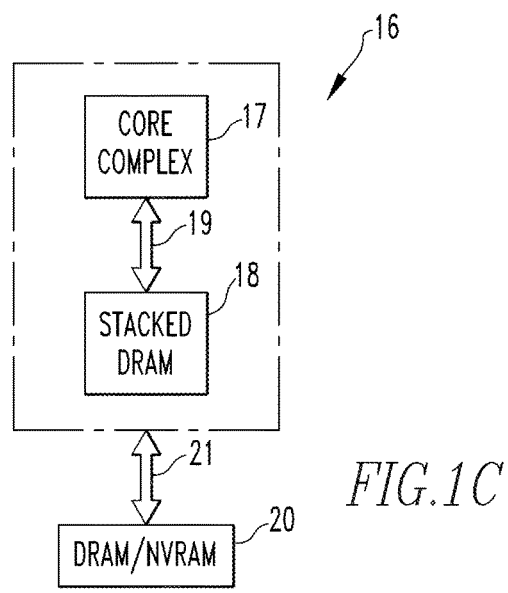

FIG. 1C is a schematic diagram of a heterogeneous NUMA system according to yet another exemplary embodiment of the disclosed concept. The heterogeneous NUMA system shown in FIG. 1C is in the form of a heterogeneous hybrid memory system 16 composed of a single socket system with heterogeneous memory modules. An example of such a system is Intel Corporation's Knights Landing (KNL) system. As seen in FIG. 1C, heterogeneous hybrid memory system 16 includes a package having a core complex 17 that is connected stacked DRAM 18 by an off-chip, on-package data fabric 19. In addition, the package including core complex 17 and stacked DRAM 18 are connected to an off-package volatile memory 20, such as DRAM or non-volatile memory (NVRAM) such as PCM, by and off-chip, off-package data fabric 21.

Thus, the various heterogeneous NUMA systems just described each include (i) a number of processing units (e.g., core complexes 4, CPU 9, GPU 12, and core complex 17), (ii) a high-bandwidth, performance-optimized but capacity-constrained near memory (e.g., one of the DRAMs 5, VRAM 13 and stacked DRAM 18), and (iii) a low bandwidth, performance constrained but capacity optimized far memory (e.g., one of the DRAMs 5, DRAM 10, and off-package volatile memory 20). In addition, in these various exemplary embodiments, one of the processing units (e.g., one of the core complexes 4, CPU 9, GPU 12, or core complex 17) is configured to execute an irregular application that utilizes a working set that is split between the near memory and the far memory.

Moreover, the disclosed concept provides a novel eviction method for use in the various heterogeneous NUMA systems just described wherein data is adaptively (i.e., not with a fixed granularity, but rather with a variable granularity) migrated out of the near memory to the far memory following the semantics of the prefetching algorithm that is/was responsible for moving data from the far memory to the near memory. More specifically, according to an aspect of the disclosed concept, data is migrated in bulk from the far memory to the near memory over the slow interconnect and maintained in the near memory in a set of data structures according to a prefetcher algorithm. The prefetcher algorithm operates according to a set of predetermined semantics that determine when and under what conditions data is to be prefetched. In particular, in the prefetcher algorithm, data is prefetched only when a first function $f$ evaluates as true. In addition, according to a further aspect of the disclosed concept, responsive to detecting that the near memory has reached its capacity and thus cannot accommodate new data migration, data is adaptively migrated out of the near memory and into the far memory over the slow interconnect according to an eviction algorithm that has its own set of predetermined semantics that determine when and under what conditions data is migrated. In the disclosed concept, the eviction algorithm (and its set of predetermined semantics) is based on and follows the set of predetermined semantics of the prefetcher algorithm. Specifically, under the eviction algorithm, data is evicted when a second function g evaluates as true, wherein the second function g equals the inverse of the first function $f$.

Figure 2:
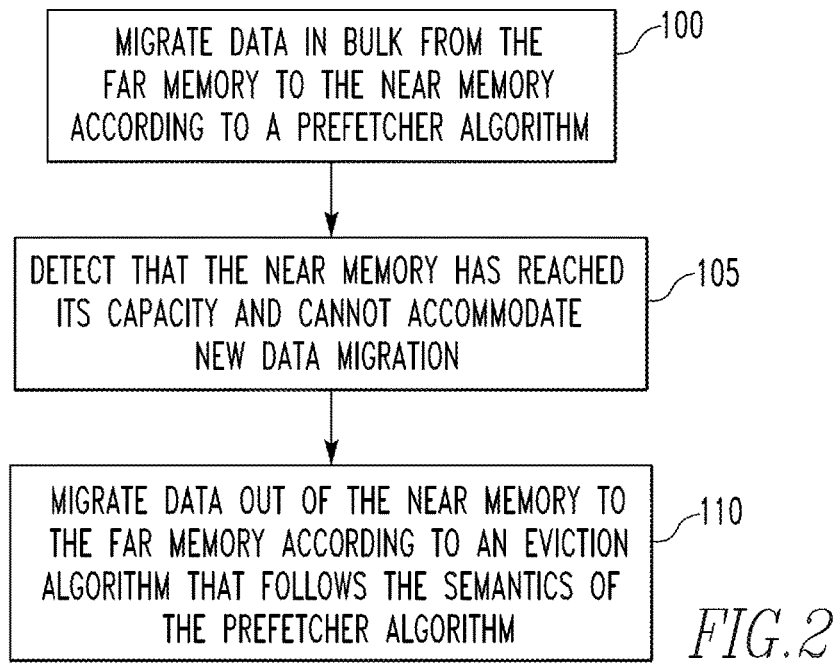
FIG. 2 is a flowchart illustrating an eviction algorithm according to a non-limiting exemplary embodiment of the disclosed concept.

Thus, FIG. 2 is a flowchart illustrating a method of data management according to the disclosed concept that may be implemented in any of the heterogeneous NUMA systems described herein. The method in FIG. 2 is, in the exemplary embodiment, executed by a driver or runtime that is hosted by one of the processing units of the heterogeneous NUMA system. As seen in FIG. 2, the method begins at step 100, wherein, during execution of the irregular application, data is migrated in bulk from the far memory to the near memory according to a prefetcher algorithm that is based on a set of semantics that determines when and under what conditions data is migrated. As noted above, in the exemplary embodiment, the predetermined semantics of the prefetcher algorithm dictate that certain data is prefetched when first function $f$ evaluates as true. Next, at step 105, during execution of the irregular application, it is determined that the near memory has reached its capacity and cannot accommodate new data migration that is required by the irregular application. Then, at step 110, in order to create space in the near memory, data is migrated out of the near memory to the far memory according to an eviction algorithm that follows the semantics of the prefetcher algorithm. More specifically, as noted above, the eviction algorithm is based on the semantics of the prefetcher algorithm such that certain of the data is evicted when a second function g evaluates as true, wherein the second function equals the inverse of the first function.

In order to further aid in the understanding of the disclosed concept, one particular, non-limiting illustrative embodiment/concrete use case of the disclosed concept will now be described, first generally, and then in more detail in connection with the detailed schematics of FIGS. 3-5.

Generally, this illustrative embodiment/concrete use case is in the form of a heterogeneous NUMA system wherein a data-intensive irregular application runs on a throughput-oriented, massive thread-parallel accelerator (e.g., a GPU) and wherein an oversubscribed working set is partially located in a bandwidth-optimized, capacity-constrained near-memory (e.g., GDDR5/HBM/VRAM). The accelerator is connected to a highly specialized, latency critical host compute unit (CPU) with a capacity optimized far-memory module (e.g., DDR4) via a slow interconnect (e.g., PCIe/xGMI). The oversubscribed data is originally allocated and initialized by the host compute unit on its local physical memory far from the accelerator. As the irregular application executes on the accelerator, data is migrated in bulk from the far-memory to the near-memory by the prefetcher running as part of the accelerator's runtime that is hosted by the accelerator's driver, which in turn, is hosted by/part of the operating system of the host compute engine. According to an aspect of the disclosed concept, as soon as the near memory reaches its physical capacity and, as a result, the working set data can no longer be migrated to the near memory, the eviction algorithm as described herein (FIG. 2) and as implemented by the accelerator's runtime initiates migration of data from the near memory to the far memory as part of the replacement and write-back process of older referenced data in order to make room in the near memory for data of the working set that needs to be migrated.

Furthermore, in this particular, non-limiting illustrative embodiment/concrete use case, a tree-based prefetcher is utilized that operates on a set of full-binary trees (wherein each non-leaf node has exactly 2 children) with 64 KB basic blocks at the leaf level. Under the semantics of the prefetcher, the decision to prefetch a 64 KB basic block is governed by the current state of the corresponding tree. If a non-leaf node of the tree has reached more than exactly 50% of its total capacity, then a prefetch is triggered (this is the function $f$ for this particular embodiment). When a non-leaf node has more than 50% occupancy, it means one of its children is completely populated and other one is partially populated. The prefetcher in this exemplary embodiment aims to balance the occupancy of two children and thus tries to fill up the partially populated child. The motivation here is to enforce spatial and temporal locality of access based on the intuition that if a child is already populated, then the other child will also likely be requested in the immediate future. The replacement algorithm in this exemplary embodiment is inspired by the prefetcher and adheres to the semantics of the prefetcher. A good replacement algorithm should be able to predict an eviction candidate that will not be referenced in the near future. So, it should ideally follow the same order and way in which the prefetcher migrated data to the near memory from the far memory while evicting data from the near memory to the far memory. Hence, in the non-limiting exemplary embodiment, the eviction algorithm checks when a non-leaf node has less than exactly 50% occupancy or one child is completely empty and other one is partially empty (this is the function g for this particular embodiment), at which point it will pre-evict the partially empty child. As the pre-eviction scheme leverages the existing tree-based implementation of the prefetcher, it does not cost any additional implementation overhead. This makes this solution simple, pragmatic, and adaptable on real systems irrespective of vendor-specific architectures.

As noted above, this concept from the non-limiting exemplary embodiment may be generalized as follows. If a prefetcher is triggered when the function $f$ is evaluated to result in true condition, then the corresponding eviction algorithm is triggered when a different function g is evaluated to result in true condition, where g is inverse of $f$ or $g=f^{-1}$.

Figure 3:
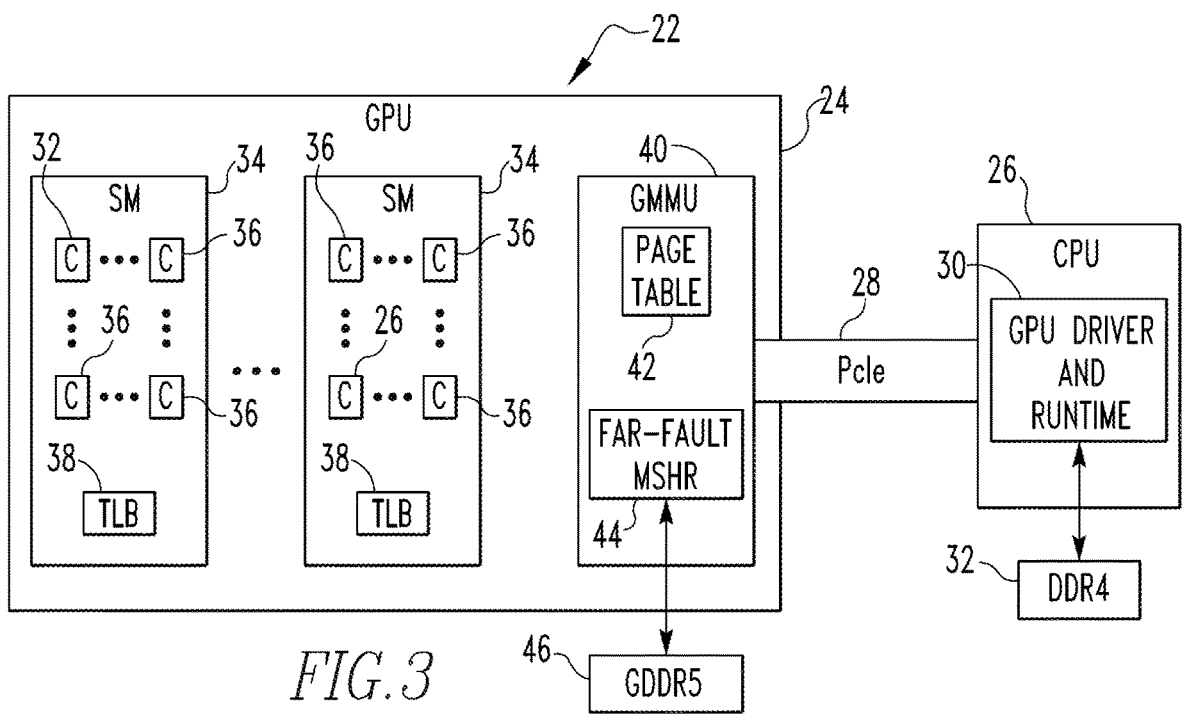
FIG. 3 is a schematic diagram of a heterogeneous NUMA system according to a particular, non-limiting illustrative embodiment/concrete use case of the disclosed concept in which the eviction algorithm of the disclosed concept may be implemented.

FIG. 3 is a schematic diagram showing the details of this illustrative embodiment/concrete use case. As seen in FIG. 3, this illustrative embodiment/concrete use case comprises a heterogeneous NUMA system 22, which is in the form of a CPU-GPU heterogeneous system (shown more generally in FIG. 1B). In addition, the particular system 22 of FIG. 3 is implemented in accordance with the NVIDIA® CUDA® parallel computing platform and programming model that implements a UVM as described herein. It will be understood, however, that system 22 is merely provided as an exemplary concrete use case for purposes of illustrating the disclosed concept, and that the disclosed concept may be implemented in systems having different components and/or architectures than those as shown in FIG. 3.

As seen in FIG. 3, system 22 includes a GPU 24 that is coupled to a host CPU 26 by way of a PCIe interconnect 28. CPU 26 hosts the GPU driver and runtime 30 of GPU 24, and is directly coupled to a far memory module 32 in the form of a DDR4 module. As also seen in FIG. 3, GPU 24 includes a plurality of streaming multi-processors (SMs) 34. Each streaming multiprocessor 34 includes a plurality of cores 36 and a load/store unit that has its own translation lookaside buffer (TLB) 38. In addition, GPU 24 further includes a GMMU 40. GMMU 40 includes a page table 42 and a far-fault miss status handling register (MSHR) 44. In addition, GPU 34 is directly coupled to a near memory module 46 in the form of a GDDR5 module.

As noted above, system 22 implements and supports UVM and, as such, allows programs to allocate data that can be accessed by both host code and kernels using a single shared pointer. The illusion of unified memory is realized by on-demand allocation and fault-driven data transfer which improves programmability. In the traditional "copy then execute" model, data is always physically available in the device memory before the kernel starts executing. IN such a model, a near-fault can occur upon an L2 cache miss. In contrast, with UVM, a new type of page fault is introduced, which will be referred to herein as a "far-fault." In particular, in the exemplary embodiment, upon allocating data, no physical memory space is allocated on either CPU 26 or GPU 24. Rather, on each access, each processor encounters a far-fault and the memory is allocated and migrated on-demand. As the memory is allocated on-demand, new page table entries (PTEs) are created in page table 42 of GPU 24, and upon completion of migration, these entries are validated (the valid flags corresponding to these PTEs are set in the page table). A far-fault is much costlier than a near-fault in terms of the time to resolve as it includes two additional major overheads: a far-fault handling latency (e.g., 45 μs) and data migration latency over PCIe interconnect 28.

To further aid in understanding the disclosed concept, a simplified exemplary control flow demonstrating how GPU 24 would handle a far-fault with on demand page migration using traditional methods will now be described. First, scheduled threads of GPU 24 generate global memory accesses. As noted above, each SM 34 has its own load/store unit, and every load/store unit has its own TLB 38. Following the global memory accesses, each load/store unit performs a TLB look up to determine whether the translation for the issued memory access is cached in TLB 38 or not. Any TLB miss is relayed to GMMU 40. Upon receipt of a TLB miss notification, GMMU 40 walks through page table 42 looking for a PTE corresponding to the requested page with a valid flag being set. A far-fault occurs if there is no PTE for the requested page or of the associated valid flag is not set. Then the far-fault is registered in the far-fault MSHR 44. Next, the page is scheduled for transfer over PCIe interconnect 28. Then, a 4 KB page is allocated on demand and data is migrated from far memory 32 (DDR4 module) to near memory 46 (GDDR5 module). The far-fault MSHR 44 is consulted to notify the corresponding load/store unit and the memory access is replayed. A new PTE entry is added to page table 42 with valid flag set or the valid flag of the existing PTE is set. In addition, a new entry is added to TLBs 38.

As discussed elsewhere herein, in UVM, massive Thread Level Parallelism (TLP) is not sufficient to mask memory access latency as the offending warps stall for the costlier far-faults. The total kernel execution time increases dramatically and closely resembles the serialized data migration and kernel execution time of the "copy then execute" model. To ameliorate this situation, systems such as NVIDIA Corporations' CUDA 8.0 have introduced mechanisms (e.g., cudaMemPrefetchAsync) which allow programmers to overlap the kernel execution with asynchronous parallel data migration. However, the onus of deciding what and when to prefetch still lies on the programmers. To address this challenge, prefetchers have been proposed and shown to provide dramatic performance improvement over traditional replayable far-fault based page migration as discussed above. For example, Agarwal et al., *Unlocking Bandwidth for GPUS in CC-NUMA Systems*, 2015 IEEE 21st International Symposium on High Performance Computer Architecture (HPCA), pages 354-365, proposed prefetching neighbors of touched pages to reduce the overhead of shared TLB shootdown. NVIDIA's UVM module also provides a smart prefetching implementation which is described in detail below.

One of the major benefits of UVM is that programmers do not need to worry about the size of the working set and the available device memory space. When the working set of the GPU application does not fit in the device memory, the GMMU of existing systems automatically evicts older pages to make room for newer page migration. NVIDIA GPUs implement a Least Recently Used (LRU) based page replacement policy. As the pages are migrated in, they are placed in a queue based on the migration timestamp. When the device memory is full, the oldest migrated page is evicted to make space for newer migration. This is a simple age-based FIFO scheme. NVIDIA GPUs go one step further than this. Specifically, after migration, if a page is accessed, then its position is updated based on the current access timestamp. Newly accessed pages are moved to the end of the queue and thus the oldest accessed page will be evicted upon oversubscription. This is how LRU page replacement policy is realized in NVIDIA GPUs. However, as noted elsewhere herein, the page replacement works at the strict granularity of a 2 MB large page. A 2 MB large page is selected for eviction only when it is fully populated and not currently addressed by scheduled warps. Evicting at 2 MB large page granularity ensures that the semantics of the tree-based prefetcher is not violated. Hence, the prefetcher remains in action even after device memory oversubscription. However, the strict granularity of 2 MB means that irrespective of whether the pages within 2 MB are dirty or clean, the GMMU always writes back 2 MB memory from device to host.

As noted elsewhere herein, such an implementation causes serious page thrashing for irregular applications with sparse, random memory accesses. Thus, to address this problem, as discussed elsewhere herein, the disclosed concept provides a novel eviction method wherein data is adaptively (i.e., not with a fixed granularity) migrated out of the near memory to the far memory following the semantics of the prefetching algorithm that is/was responsible for moving data from the far memory to the near memory. In order to understand the implementation of the disclosed concept in the particular exemplary embodiment of FIG. 3 (the example concrete use case), it will thus first be necessary to understand the operation of the NVIDIA's tree-based prefetcher that is implemented by the CUDA® runtime (such tree-based neighborhood prefetcher being referred to herein as $TBN_p$). Such an explanation is provided below, followed by a detailed description of how the novel eviction method of the disclosed concept can be implemented in system 22 of FIG. 3 following the semantics of that prefetcher.

In operation, $TBN_p$, upon allocating data with cudaMallocManaged (part of the CUDA® runtime), the user-specified size is first rounded up to the next $2^i*64$ KB. Then, the allocated size is logically divided into 2 MB large pages plus a fraction of 2 MB. For example, from a user specified size of 4 MB+168 KB, three logical chunks are created, two chunks each of 2 MB and one chunk of 256 KB. Then each of these chunks are further divided into 64 KB basic blocks, which is the unit of prefetching, to create three full-binary trees where leaf-levels hold 64 KB basic blocks.

Figure 4A:
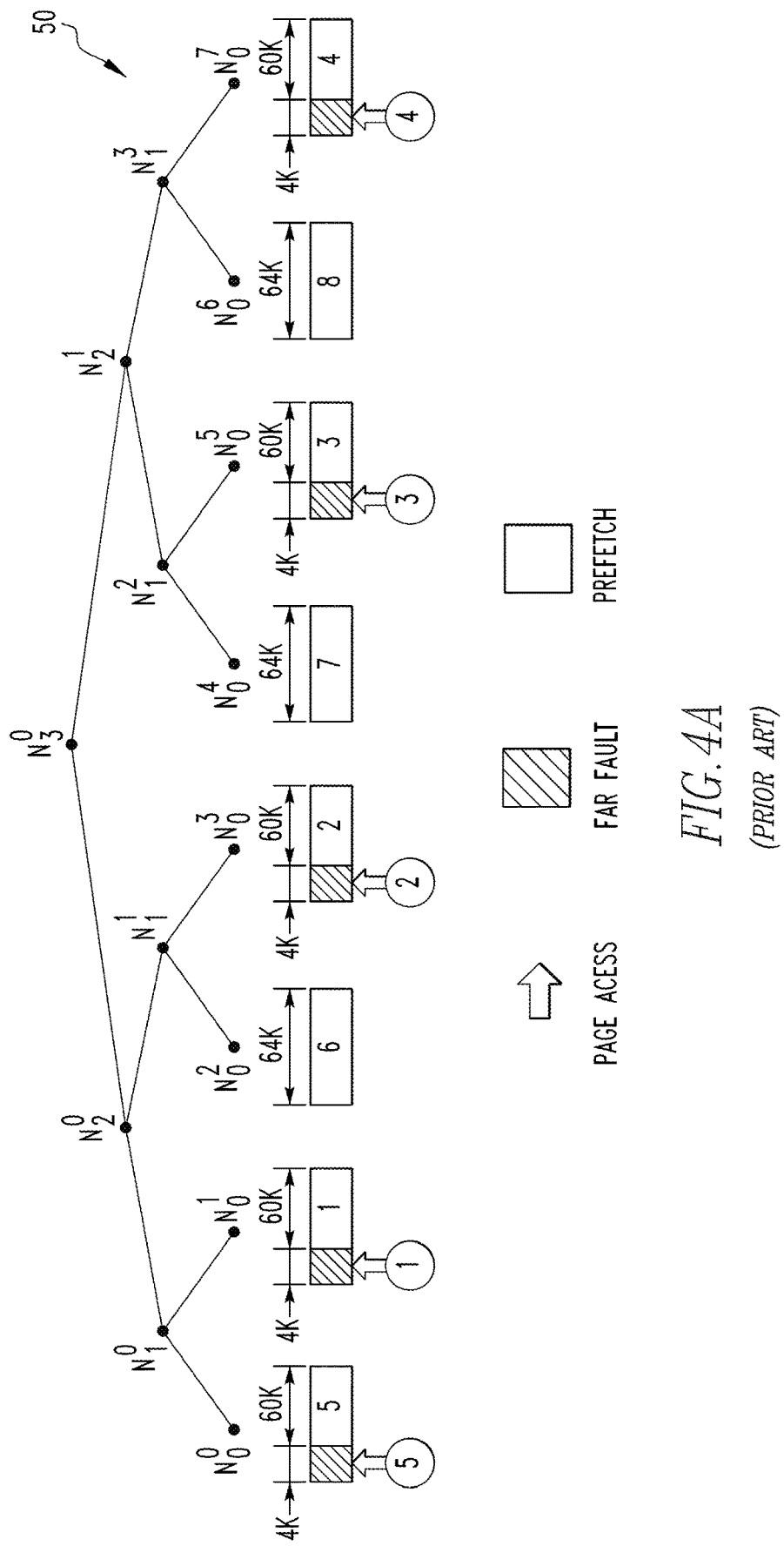
FIGS. 4A and 4B are schematic diagrams that demonstrate the semantics of a known tree-based neighborhood prefetcher.
Figure 4B:
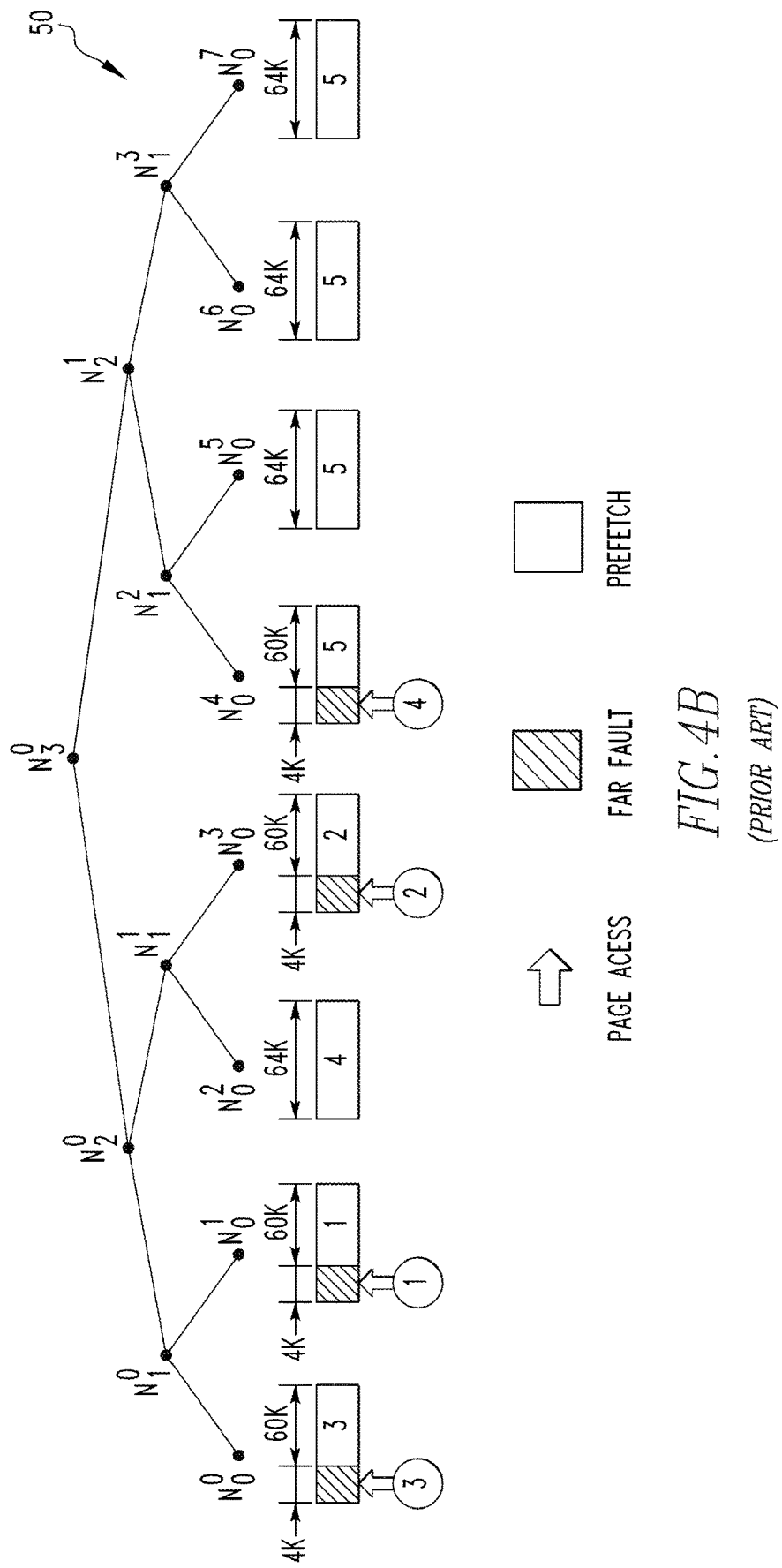

FIGS. 4A and 4B are schematic diagrams that demonstrate the semantics of the $TBN_p$ in two examples on a 512 KB memory allocation 50 for simplicity. In FIGS. 4A and 4B, $N_h^i$ denotes a node in the full binary tree, where h is the height of the node and i is the number of nodes in that particular level. It is further assumed that initially all pages in this 512 KB allocation are invalid with the valid flag/bit not set in the GPU's page table and thus every page access causes a far-fault.

In the first example (FIG. 4A), for the first four far-faults, the runtime identifies the corresponding basic blocks $N_0^1$, $N_0^3$, $N_0^5$, and $N_0^7$ for migration. In the example, as the first byte of every basic block is accessed, the basic blocks are split into 4 KB page-fault groups and 60 KB prefetch groups. All memory transfers are serialized in time. After these first four accesses, each of nodes $N_0^1$, $N_0^3$, $N_0^5$, and $N_0^7$ has 64 KB valid pages. Then, the runtime traverses the full tree to update the valid page size for all the parent nodes and thus each node at h=1 ($N_0^1$, $N_1^1$, $N_1^2$, and $N_1^3$) has 64 KB valid pages. When the fifth access occurs, the GMMU discovers that $N_1^0$ and $N_2^0$ will have 128 KB and 192 KB valid pages respectively. For $N_2^0$, the to-be valid size is greater than 50% of the maximum valid size of 256 KB. Hence, the right child $N_1^1$ is identified for prefetching. This decision is then pushed down to the children. This process identifies the basic block $N_0^2$ as a prefetch candidate. Further, the runtime discovers that after prefetching $N_0^2$, $N_3^0$ will have 320 KB of valid pages which is more than 50% of the maximum valid size of 512 KB. Then, node $N_3^0$ pushes prefetch request to the node $N_2^1$ which in turn pushes it to its children. This process identifies basic blocks No and No for further prefetching.

In the second example (FIG. 4B), the first two far-faults cause migration of basic blocks $N_0^1$ and $N_0^3$. The runtime traverses the tree to update the valid size of nodes $N_1^0$ and $N_1^1$ as 64 KB each. At the third far-fault, as basic block No is migrated, the estimated valid sizes for nodes $N_1^0$, and $N_2^0$ are updated as 128 KB and 192 KB respectively. As the valid size of $N_2^0$ is more than 50% of the maximum valid size of 256 KB, $N_0^2$ is identified for prefetching. After this point, the $N_2^0$ is fully balanced and both $N_2^0$ and $N_3^0$ have exactly 256 KB of valid pages. On the fourth access, the runtime discovers that the valid size of $N_3^0$ will be 320 KB, which is more than 50% of the maximum memory size it can hold. This imbalance causes prefetching of nodes $N_0^5$, $N_0^6$, and $N_0^7$. Note at this point, as the runtime finds four consecutive basic blocks, it groups them together to take advantage of higher bandwidth. Then, based on the page fault, it splits this 256 KB into two transfers: 4 KB and 252 KB. An interesting point to observe here is that for a full binary tree of 2 MB size, $TBN_p$ can prefetch at most 1020 KB at once in a scenario similar to the second example.

Typical GPGPU workloads are massively parallel and show spatio-temporal locality. Thus, the tree-based prefetcher $TBN_p$, upon limiting its prefetch decision within 2 MB, provides spatio-temporal locality within large pages. Moreover, it results in allocation of contiguous physical memory and thus helps reduce bypassing nested page table walk. The tree-based prefetcher $TBN_p$ trades in the spectrum of two extremities: 4 KB small pages and 2 MB large pages. It adapts to the current state of the tree and opportunistically decides on the prefetch size ranging from 64 KB to 1 MB instead of a fixed granularity.

As described above, a good prefetcher prefetches pages with spatio-temporal locality with the anticipation that these pages will be consumed by the threads in the immediate future. As also described above, the tree-based prefetcher $TBN_p$ improves performance by reducing the number of far-faults and provides higher programmability. However, aggressive prefetching under a strict memory budget proves to be counterproductive. Moreover, naive LRU page replacement with 2 MB eviction granularity can cause displacement of heavily referenced pages. As a result, GPGPU workloads suffer from dramatic performance degradation.

The disclosed concept thus introduces a new pre-eviction policy that adapts to the semantics of the associated prefetcher and reduces page thrashing. More specifically, described below is a tree-based neighborhood pre-eviction ($TBN_e$) strategy according to a non-limiting exemplary embodiment of the disclosed concept that is inspired by the $TBN_p$ and that may be implemented in system 2 of FIG. 3 (for illustrative purposes). It leverages the full-binary tree structures created and maintained for prefetching at the time of managed allocation. Thus, it accounts for no additional implementation overhead. As discussed above, all nodes in these full-binary trees correspond to 64 KB basic blocks and the root node of each tree corresponds to a maximum contiguous virtual space of 2 MB large page or a size equivalent to 2i*64 KB. An eviction candidate is chosen from the LRU list. Then, a 64 KB basic block, to which this eviction candidate belongs, is identified for pre-eviction. After selection of every pre-eviction candidate, the GPU driver and runtime 30 of CPU 26 traverses the whole tree, updating the valid page size of all its parent nodes including the root node by subtracting the size of the evicted basic block. At any point, if the total valid size of any node is strictly less than 50% of the maximum valid size of that node, a further pre-eviction decision is made by GPU driver and runtime 30, which is in turn pushed down to the children to the leaf level. This process continues recursively until no more basic blocks can be identified for pre-eviction or no node higher than leaf level including root node has valid size less than 50% of the maximum capacity at the corresponding tree level. The eviction granularity in this scheme varies between 64 KB to 1 MB and thus it adapts between the two extremities of 4 KB and 2 MB eviction granularity for LRU.

Figure 5:
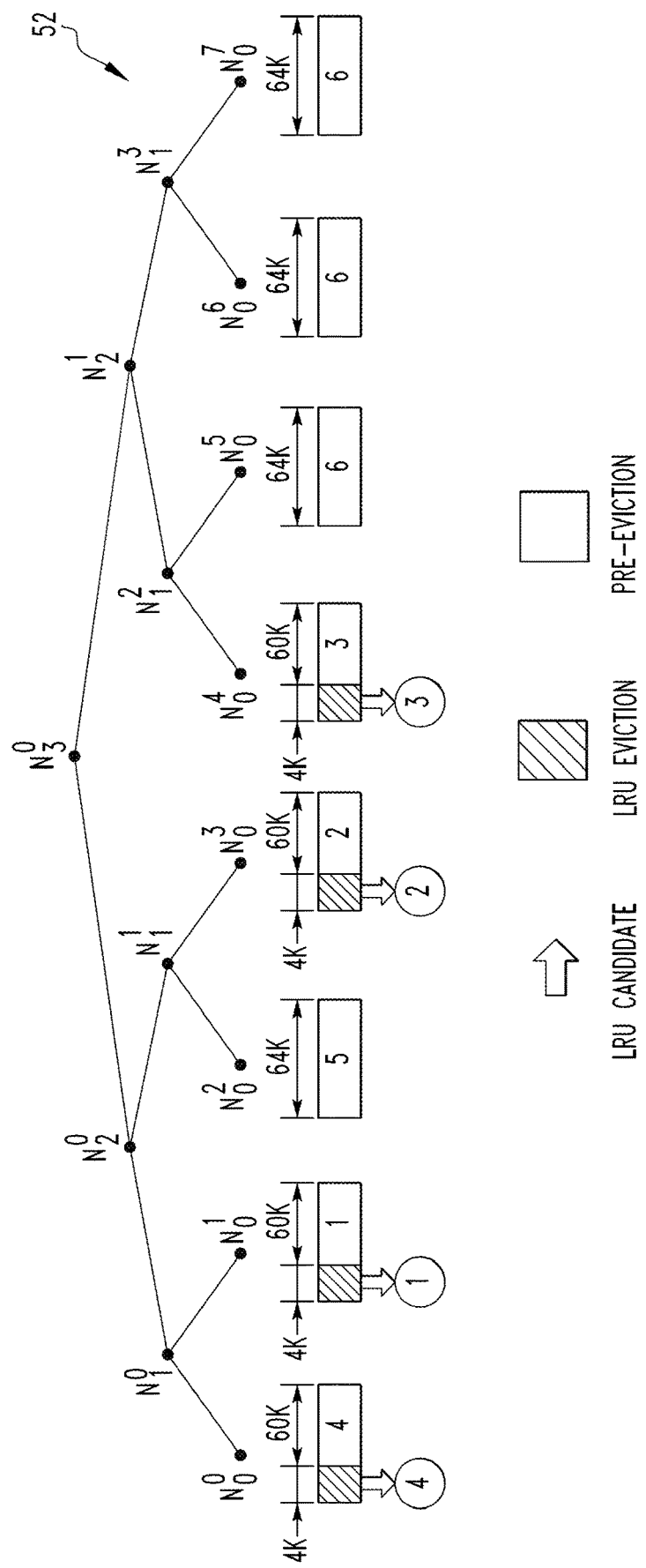
FIG. 5 is a schematic diagram that demonstrates a tree-based neighborhood eviction scheme according to an exemplary embodiment of the disclosed concept that is based on and follows the semantics of the tree-based neighborhood prefetcher associated with FIGS. 4A and 4B.

FIG. 5 is a schematic diagram that demonstrates the $TBN_e$ of the exemplary embodiment of the disclosed concept on a 512 KB memory allocation 52 for simplicity as implemented in system 2 of FIG. 3. Initially, it is assumed that all pages in this 512 KB allocation are valid in the page table. It is further assumed that the first three entries in the LRU list correspond to the basic blocks $N_0^1$, $N_0^3$, and $N_0^4$. Upon over-subscription, when the page replacement routine of the disclosed concept kicks in, these three basic blocks are identified for eviction one after another. After evicting the first three basic blocks, the valid size for each of the nodes $N_1^0$, $N_1^1$, and $N_1^2$ is updated to 64 KB by GPU driver and runtime 30. Further the valid sizes for nodes $N_2^0$, $N_2^1$, and $N_3^0$ are updated as 128 KB, 192 KB, and 320 KB respectively. Now assume that the current least recently used page corresponds to the basic block $N_0^0$. After the fourth pre-eviction, the valid sizes of $N_1^0$, and $N_2^0$ are updated as 0 KB and 64 KB respectively. As the current valid size for $N_2^0$ is 64 KB and is less than 50% of its maximum capacity, a further pre-eviction decision is made for $N_1^1$ and is pushed to its children. This ultimately chooses $N_0^2$ as a pre-eviction candidate. At this point, GPU driver and runtime 30 traverses the tree and updates the valid sizes of all nodes in the tree. It then discovers the valid size of $N_3^0$ to be 192 KB, which is less than 50% of its maximum capacity. This pushes pre-eviction decision to $N_2^1$ and in turn to its children. This process identifies basic blocks $N_0^5$, $N_0^6$, and $N_0^7$ as pre-eviction candidates. As these blocks are contiguous, GPU driver and runtime 30 groups them together into a single transfer.

In one particular illustrative implementation, $TBN_e$ first selects an eviction candidate from the LRU list and then identifies the corresponding 64 KB basic block for eviction. These basic blocks, up for eviction, can have some pages with dirty and/or access flags set in the page table along with some pages for which these flags are not set and only valid bits are set in the page table. However, in this particular implementation, the LRU page list is maintained particular way. Specifically, all the pages are placed in the LRU list when the valid flags of the corresponding page table entries are set in the GPU page table. This means the LRU list contains all pages with valid flags set in the GPU page table in contrast to the traditional LRU list which only maintains pages with the access flags set in the page table. Further, a page is pushed to the back of the LRU list upon any read or write access in the course of execution. Upon evicting a basic block, all pages including the eviction candidate are removed from the LRU list. Hence, particular implementation ensures all pages local to the eviction candidate are evicted irrespective of whether they are accessed or not. This is how $TBN_e$ in this implementation deals with the unused prefetched pages migrated by the $TBN_p$ and frees up contiguous virtual address space. The pages are first sorted at the large page level based on the access timestamp of the 2 MB chunk they belong to. Then, within the 2 MB large page, 64 KB basic blocks are sorted based on their respective access timestamps. This hierarchical sorting ensures a global order at 2 MB large page level and a local order of 64 KB basic blocks at leaf-level of 2 MB tree.

The disclosed concept thus provides a novel vendor and architecture agnostic eviction algorithm for systems made of discrete and disparate memory modules with heterogeneity in their performance characteristics and storage capacity that is responsible for evicting and writing data back from a near memory to a far memory that follows and works in tandem with the prefetcher that is responsible for migrating data in bulk from the far memory to the near memory over a slow interconnect. This coordination between prefetching and eviction algorithms provides for improved performance of irregular applications with oversubscribed working sets split between the near and far memories.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of managing data during execution of an application that uses a working set of data, wherein the working set of data is distributed between a near memory and a far memory, the method comprising:

migrating first data in bulk from the far memory to the near memory and storing the first data in the near memory according to a prefetcher algorithm, wherein the first data is a subset of the working set of data and is migrated from the far memory and maintained in the near memory in a set of data structures according to a set of predetermined semantics of the prefetcher algorithm, wherein the set of data structures for maintaining the first data includes a data structure in the form of a full binary tree structure and wherein the first data is stored in the near memory in and using the full binary tree structure, wherein the full-binary tree structure has a plurality of non-leaf nodes each having exactly two children and a leaf level having plurality of leaf nodes, wherein each of the leaf nodes is a basic memory block having a predetermined storage capacity, wherein each of the non-leaf nodes has a total storage capacity that is a sum of the predetermined storage capacities of each of the leaf nodes that are linked under the non-leaf-node in the full-binary tree structure, wherein the predetermined semantics dictate that certain of the first data is prefetched when a first function evaluates as true according to a first capacity-based thresholding scheme applied to the full binary tree structure, wherein the first function evaluates as true if any of the non-leaf nodes of the full-binary tree structure has a data occupancy that is more than exactly a certain percentage of its total storage capacity;

detecting that the near memory has reached a capacity threshold wherein at least a portion of the near memory is at least partially empty; and responsive to the detecting, adaptively migrating a portion of the first data out of the near memory and into the far memory according to an eviction algorithm that is based on the set of predetermined semantics of the prefetcher algorithm such that certain of the portion of the first data is evicted when a second function evaluates as true according to a second capacity based thresholding scheme applied to the full binary tree structure, wherein the second function equals the inverse of the first function, wherein a size of the certain of the portion is not required to be fixed granularity, and wherein the second function evaluates as true if any of the non-leaf nodes of the full-binary tree structure has a data occupancy that is less than exactly the certain percentage of its total storage capacity.

2. The method according to claim 1, wherein a capacity of the near memory is smaller than a size of the working set such that the entirety of the working set cannot fit in the near memory.

3. The method according to claim 1, wherein the application is an irregular application having unpredictable memory access.

4. The method according to claim 1, wherein the method is performed in a heterogeneous NUMA system that includes a first processing unit coupled to the near memory, and wherein the first processing unit is configured to execute the application using the working set of data.

5. The method according to claim 4, wherein the near memory and the far memory are not provided on the same package and are connected by an off-package data-fabric.

6. The method according to claim 5, wherein the first processing unit is a massive thread-parallel accelerator.

7. The method according to claim 6, heterogeneous NUMA system is a CPU-GPU heterogeneous system and wherein the massive thread-parallel accelerator is a graphics processing unit (GPU).

8. The method according to claim 7, wherein the heterogeneous NUMA system includes a second processing unit in the form of a host central processing unit (CPU).

9. The method according to claim 8, wherein the off-package data-fabric is a PCIe interconnect.

10. The method according to claim 1, wherein the method is performed in a heterogeneous NUMA system, wherein the near memory is provided in a first package and the far memory is provided in a second package separate from the first package, and wherein the near memory and the far memory are connected by an off package data-fabric.

11. The method according to claim 1, wherein the certain percentage is 50%.

12. The method according to claim 1, wherein the set of data structures includes a plurality of trees each having a root node having a timestamp associated therewith, wherein the adaptively migrating the portion of the first data out of the near memory is performed on a selected one of the trees having the oldest timestamp of the plurality of trees.

13. A non-transitory computer readable medium storing one or more programs, including instructions, which when executed by a processor, causes the processor to perform the method of claim 1.

14. A system for executing an application, comprising:
a processing unit;
a near memory; and
a far memory coupled to the near memory;
wherein the processing unit is configured to execute the application using a working set of data in a condition where the working set of data is distributed between the near memory and the far memory, and wherein the system is configured to:
cause first data to be migrated in bulk from the far memory to the near memory and stored in the near memory according to a prefetcher algorithm, wherein the first data is a subset of the working set of data and is migrated from the far memory and maintained in the near memory in a set of data structures according to a set of predetermined semantics of the prefetcher algorithm, wherein the set of data structures for maintaining the first data includes a data structure in the form of a full binary tree structure and wherein the first data is stored in the near memory in and using the full binary tree structure, wherein the full-binary tree structure has a plurality of non-leaf nodes each having exactly two children and a leaf level having plurality of leaf nodes, wherein each of the leaf nodes is a basic memory block having a predetermined storage capacity, wherein each of the non-leaf nodes has a total storage capacity that is a sum of the predetermined storage capacities of each of the leaf nodes that are linked under the non-leaf-node in the full-binary tree structure, wherein the predetermined semantics dictate that certain of the first data is prefetched when a first function evaluates as true according to a first capacity-based thresholding scheme applied to the full binary tree structure, wherein the first function evaluates as true if any of the non-leaf nodes of the full-binary tree structure has a data occupancy that is more than exactly a certain percentage of its total storage capacity;
detect that the near memory has reached a capacity threshold wherein at least a portion of the near memory is at least partially empty; and
responsive to the detecting that the near memory has reached its capacity threshold, cause a portion of the first data to be adaptively migrated out of the near memory and into the far memory according to an eviction algorithm that is based on the set of predetermined semantics of the prefetcher algorithm such that certain of the portion of the first data is evicted when a second function evaluates as true according to a second capacity based thresholding scheme applied to the full binary tree structure, wherein the second function equals the inverse of the first function, wherein a size of the certain of the portion is not required to be fixed granularity, and wherein the second function evaluates as true if any of the non-leaf nodes of the full-binary tree structure has a data occupancy that is less than exactly the certain percentage of its total storage capacity.

15. The system according to claim 14, wherein a capacity of the near memory is smaller than a size of the working set such that the entirety of the working set cannot fit in the near memory.

16. The system according to claim 14, wherein the application is an irregular application having unpredictable memory access.

17. The system according to claim 14, wherein the system is a heterogeneous NUMA system further comprising a second processing unit configured to execute the eviction algorithm, wherein the near memory and the far memory are not provided on the same package and are connected by an off-package data-fabric.

18. The system according to claim 17, wherein the processing unit is a massive thread-parallel accelerator.

19. The system according to claim 18, wherein the system is a CPU-GPU heterogeneous system, and wherein the massive thread-parallel accelerator is a graphics processing unit (GPU).

20. The system according to claim 19, wherein a GPU runtime hosted by the second processing unit is configured to execute the eviction algorithm.

21. The system according to claim 20, wherein the second processing unit is a host central processing unit (CPU).

22. The system according to claim 17, wherein the off-package data fabric is a PCIe interconnect.

23. The system according to claim 14, wherein system is a heterogeneous NUMA system, wherein the near memory is provided in a first package and the far memory is provided in a second package separate from the first package, and wherein the near memory and the far memory are connected by an on-package data-fabric.

24. The system according to claim 14, wherein the certain percentage is 50%.

25. The system according to claim 14, wherein the set of data structures includes a plurality of trees each having a root node having a timestamp associated therewith, wherein the adaptively migrating the portion of the first data out of the near memory is performed on a selected one of the trees having the oldest timestamp of the plurality of trees.

26. An apparatus for use in a system for executing an application, wherein the application uses a working set of data, wherein the working set of data is distributed between a near memory and a far memory that are coupled to one another, the apparatus comprising:
a processing unit configured to: (i) cause first data to be migrated in bulk from the far memory to the near memory and stored in the near memory according to a prefetcher algorithm, wherein the first data is a subset of the working set of data and is migrated from the far memory and maintained in the near memory in a set of data structures according to a set of predetermined semantics of the prefetcher algorithm, wherein the set of data structures for maintaining the first data includes a data structure in the form of a full binary tree structure and wherein the first data is stored in the near memory in and using the full binary tree structure, wherein the full-binary tree structure has a plurality of non-leaf nodes each having exactly two children and a leaf level having plurality of leaf nodes, wherein each of the leaf nodes is a basic memory block having a predetermined storage capacity, wherein each of the non-leaf nodes has a total storage capacity that is a sum of the predetermined storage capacities of each of the leaf nodes that are linked under the non-leaf-node in the full-binary tree structure, wherein the predetermined semantics dictate that certain of the first data is prefetched when a first function evaluates as true according to a first capacity-based thresholding scheme applied to the full binary tree structure, wherein the first function evaluates as true if any of the non-leaf nodes of the full-binary tree structure has a data occupancy that is more than exactly a certain percentage of its total storage capacity and (ii) responsive to detecting that the near memory has reached a capacity threshold wherein at least a portion of the near memory is at least partially empty, cause a portion of the first data to be adaptively migrated out of the near memory and into the far memory according to an eviction algorithm that is based on the set of predetermined semantics of the prefetcher algorithm such that certain of the portion of the first data is evicted when a second function evaluates as true according to a second capacity based thresholding scheme applied to the full binary tree structure, wherein the second function equals the inverse of the first function, wherein a size of the certain of the portion is not required to be fixed granularity, and wherein the second function evaluates as true if any of the non-leaf nodes of the full-binary tree structure has a data occupancy that is less than exactly the certain percentage of its total storage capacity.

27. The apparatus according to claim 26, wherein a capacity of the near memory is smaller than a size of the working set such that the entirety of the working set cannot fit in the near memory.

28. The apparatus according to claim 26, wherein the application is an irregular application having unpredictable memory access.

29. The apparatus according to claim 28, wherein the application is configured for execution by a massive thread-parallel accelerator that is connected to the processing unit.

30. The apparatus according to claim 29, wherein the massive thread-parallel accelerator is a graphics processing unit (GPU).

31. The apparatus according to claim 30, a GPU runtime hosted by the processing unit is configured to execute the eviction algorithm.

32. The apparatus according to claim 26, wherein the certain percentage is 50%.

33. The apparatus according to claim 26, wherein the set of data structures includes a plurality of trees each having a root node having a timestamp associated therewith, wherein the adaptively migrating the portion of the first data out of the near memory is performed on a selected one of the trees having the oldest timestamp of the plurality of trees.

* * * * *